United States Patent
Shimizu

(10) Patent No.: US 10,277,528 B2
(45) Date of Patent: Apr. 30, 2019

(54) RESOURCE MANAGEMENT FOR DISTRIBUTED SOFTWARE DEFINED NETWORK CONTROLLER

(71) Applicant: FUJITSU LIMITED, Kawasaki-shi, Kanagawa (JP)

(72) Inventor: Sho Shimizu, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 149 days.

(21) Appl. No.: 15/234,948

(22) Filed: Aug. 11, 2016

(65) Prior Publication Data
US 2018/0048585 A1 Feb. 15, 2018

(51) Int. Cl.
G06F 15/16 (2006.01)
G06F 15/173 (2006.01)
H04L 12/911 (2013.01)
H04L 12/917 (2013.01)
H04L 29/08 (2006.01)

(52) U.S. Cl.
CPC .............. *H04L 47/78* (2013.01); *H04L 47/76* (2013.01); *H04L 67/10* (2013.01)

(58) Field of Classification Search
CPC .......... H04L 47/78; H04L 47/76; H04L 67/10
USPC ........................................................ 709/226
See application file for complete search history.

(56) References Cited

U.S. PATENT DOCUMENTS

| 8,718,070 | B2 | 5/2014 | Koponen et al. | |
|---|---|---|---|---|
| 8,830,823 | B2 | 9/2014 | Koponen et al. | |
| 9,819,540 | B1* | 11/2017 | Bahadur | H04L 41/0813 |
| 9,819,565 | B2* | 11/2017 | Djukic | H04L 43/0876 |
| 9,825,833 | B2* | 11/2017 | Amulothu | H04L 43/0882 |
| 9,836,244 | B2* | 12/2017 | Bates | G06F 3/065 |
| 9,838,268 | B1* | 12/2017 | Mattson | H04L 41/32 |
| 9,838,271 | B2* | 12/2017 | Djukic | H04L 41/5006 |
| 9,851,933 | B2* | 12/2017 | Brech | H04L 41/0893 |
| 9,882,797 | B2* | 1/2018 | Amokrane | H04L 43/0882 |
| 9,882,828 | B1* | 1/2018 | Sandlerman | H04L 47/74 |
| 9,882,993 | B2* | 1/2018 | Chastain | H04L 41/5054 |
| 9,906,415 | B2* | 2/2018 | Morgan | H04L 41/12 |
| 9,912,573 | B1* | 3/2018 | Zemlerub | H04L 43/50 |
| 9,912,613 | B2* | 3/2018 | Chou | H04L 49/25 |
| 2017/0279722 | A1* | 9/2017 | Amulothu | H04L 5/0053 |
| 2017/0279760 | A1* | 9/2017 | Li | H04L 51/36 |
| 2017/0295082 | A1* | 10/2017 | Wu | H04L 43/14 |
| 2017/0300353 | A1* | 10/2017 | Yu | H04L 29/08 |
| 2017/0310600 | A1* | 10/2017 | Gasparakis | H04L 47/24 |

(Continued)

OTHER PUBLICATIONS

Koponen et al., "Onix: A Distributed Control Platform for Large-Scale Production Networks," Operating Systems Design and Implementation (OSDI), pp. 1-6, Oct. 2010.

(Continued)

*Primary Examiner* — Melvin H Pollack
(74) *Attorney, Agent, or Firm* — Maschoff Brennan

(57) ABSTRACT

A method and system for resource allocation in a Software Defined Network (SDN) controller includes instantiating a sub-data store corresponding to a portion of a main data store when resource write requests for the portion are determined to exceed a defined load. The method and system may further include receiving the resource write requests for the main data store. In addition, the method and system may include dispatching resource requests for the portion of the main data store to the sub-data store when the sub-data store is instantiated.

18 Claims, 8 Drawing Sheets

(56) References Cited

U.S. PATENT DOCUMENTS

| | | | | |
|---|---|---|---|---|
| 2017/0339003 | A1* | 11/2017 | Strom | H04L 41/046 |
| 2017/0373942 | A1* | 12/2017 | Ong | H04L 49/254 |
| 2017/0373987 | A1* | 12/2017 | Chang | H04L 45/02 |
| 2017/0374028 | A1* | 12/2017 | Oliver | H04L 63/0227 |
| 2018/0024537 | A1* | 1/2018 | Chauvet | G05B 19/4185 |
| 2018/0024853 | A1* | 1/2018 | Warfield | G06F 9/45558 |
| 2018/0034735 | A1* | 2/2018 | Zaifman | H04L 47/125 |
| 2018/0041388 | A1* | 2/2018 | Moens | H04L 41/0806 |
| 2018/0041905 | A1* | 2/2018 | Ashrafi | H04W 16/10 |
| 2018/0046477 | A1* | 2/2018 | Aelken | G06F 9/45529 |
| 2018/0062943 | A1* | 3/2018 | Djukic | H04L 41/5009 |

OTHER PUBLICATIONS

Lantz et al., "ONOS: Towards an Open, Distributed SDN OS," Hot Topics in Software Defined Networking (HotSDN 2014).

* cited by examiner

| Resource | User |
|---|---|
| Node 1 | None |
| Port 1 | None |
| VLAN ID 1 | App #2 |
| Port 2 | None |
| MPLS Label 1 | App #1 |
| Node 2 | None |
| Port 1 | None |
| Lambda 1 | None |
| Lambda 2 | None |

FIG. 4

RESOURCE MANAGEMENT FOR DISTRIBUTED SOFTWARE DEFINED NETWORK CONTROLLER

FIELD

The embodiments discussed herein are related to resource allocation in a Software Defined Network (SDN).

BACKGROUND

Computer networks have long been managed through low-level configurations of individual components. As networks have become more sophisticated and complex, management through low-level configuration has become unwieldy and limiting. An alternative paradigm for network management has been proposed which provides higher-level control and administration of the network components. This alternative network topology has been called a Software-Defined Network (SDN). In an SDN, a network controller, such as an SDN controller running on one or more servers in a network, controls and maintains control logic that governs the forwarding behavior of shared network switching elements. SDN resources may be allocated and deallocated as needed. However, performance may be degraded when resource allocation/deallocation requests are heavily issued for certain areas of the network.

The subject matter claimed herein is not limited to embodiments that solve any disadvantages or that operate only in environments such as those described above. Rather, this background is only provided to illustrate one example technology area where some embodiments described herein may be practiced.

SUMMARY

One or more embodiments of the present disclosure may include methods and systems for resource allocation in a Software Defined Network (SDN) controller. According to one embodiment, a method may include instantiating a sub-data store corresponding to a portion of a main data store when resource write requests for the portion are determined to exceed a defined load. The method may further include receiving the resource write requests for the main data store. In addition, the method may include dispatching resource requests for the portion of the main data store to the sub-data store when the sub-data store is instantiated.

The object and advantages of the embodiments may be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which:

FIG. 4 illustrates an example of information stored in the distributed data store;

DESCRIPTION OF EMBODIMENTS

The present disclosure relates to an approach to prevent performance degradation of resource management in a distributed SDN controller environment when resource allocation and deallocation requests are heavily issued for a certain area of the network. In such an environment, the data store for resource management is distributed and the number of write requests to the store impacts the performance due to strong consistency characteristics.

A centrally controlled network like an SDN network must also be scalable and reliable. One extension of a generic SDN network may include a logically centralized architecture with a physically distributed control plane. Such an architecture is known to include distributed SDN controllers and provide scalability and reliability while preserving the centralized control. Further the SDN controllers may be grouped or configured as distributed SDN controllers that may simultaneously handle a large number of devices and applications in the SDN. In a distributed SDN controller system, each network switch is mapped to a distributed controller.

SDNs with distributed SDN controllers also raise issues relating to consistency across the multiple SDN controllers when an SDN operates with distributed SDN controller instances. Some SDNs with distributed SDN controllers maintain consistency using a transactional database for persistent but less dynamic data while other distributed SDN controllers replicate the events at all distributed nodes, so that each node may process such events.

In the present disclosure, a sub-data store for resource allocation is instantiated when an area of the network is highly loaded with resource requests. The subsequent resource requests for the area are then dispatched to the sub-data store. Such an approach reduces the load of the main data store thereby maintaining acceptable performance for the other network areas.

As stated, an SDN provides improved networking by enabling programmability and easier management of network assets. These improvements are possible due to a centralized control plane architecture allowing the network to be programmed by an application controlled by a central entity.

Embodiments of the present disclosure are now explained with reference to the accompanying drawings.

Figure 1:
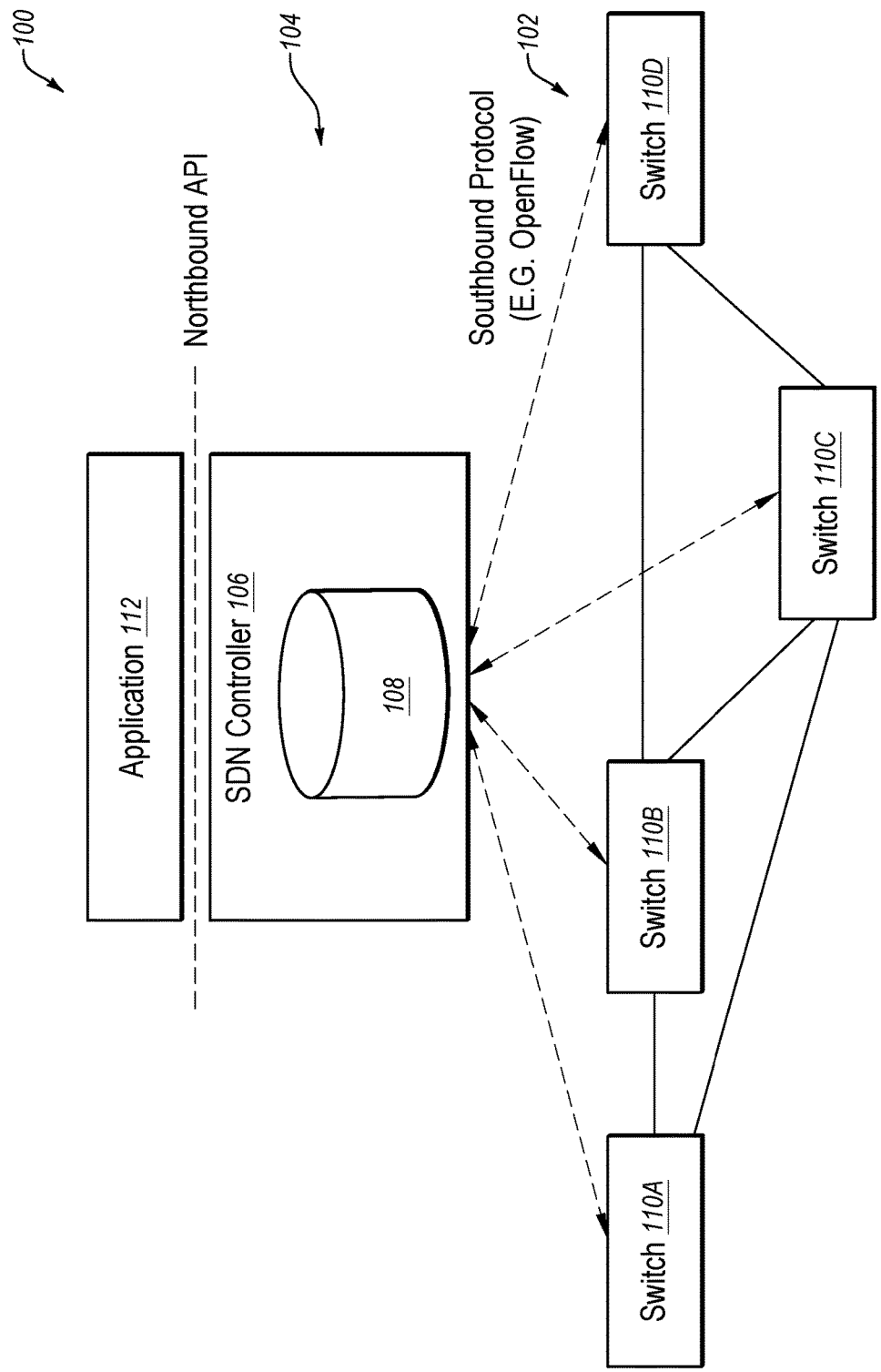
FIG. 1 is a block diagram of a Software Defined Network (SDN)

FIG. 1 is a block diagram of a Software Defined Network (SDN). An SDN 100 may include a data plane 102 decoupled from a control plane 104, thus simplifying the network. The control plane 104 may include functions that may be implemented in one or more SDN controllers 106. Each SDN controller 106 may include a data store 108 that stores resource allocation information including switch-specific information. Each SDN controller 106 may include a plurality or cluster of autonomous distributed controllers that coordinate amongst themselves to provide a consistent control logic for the entire SDN. The various switches connect to distributed controllers, one of which may act as the master and the rest as slaves.

The data plane 102 of SDN 100 may include a number of switches 110, more specifically including switches 110A-110D. The switches 110 forward packets according to rules stored in flow tables (not shown) within the switches 110 based on the rules sent to each switch 110 by the SDN controller 106.

The SDN 100 may further include applications 112 interacting with the SDN controller 106 to implement different control logics and network functions. Packet processing rules (not shown) may be installed in switches 110 either when a new flow arrives or prior to the arrival of a new flow.

Figure 2:
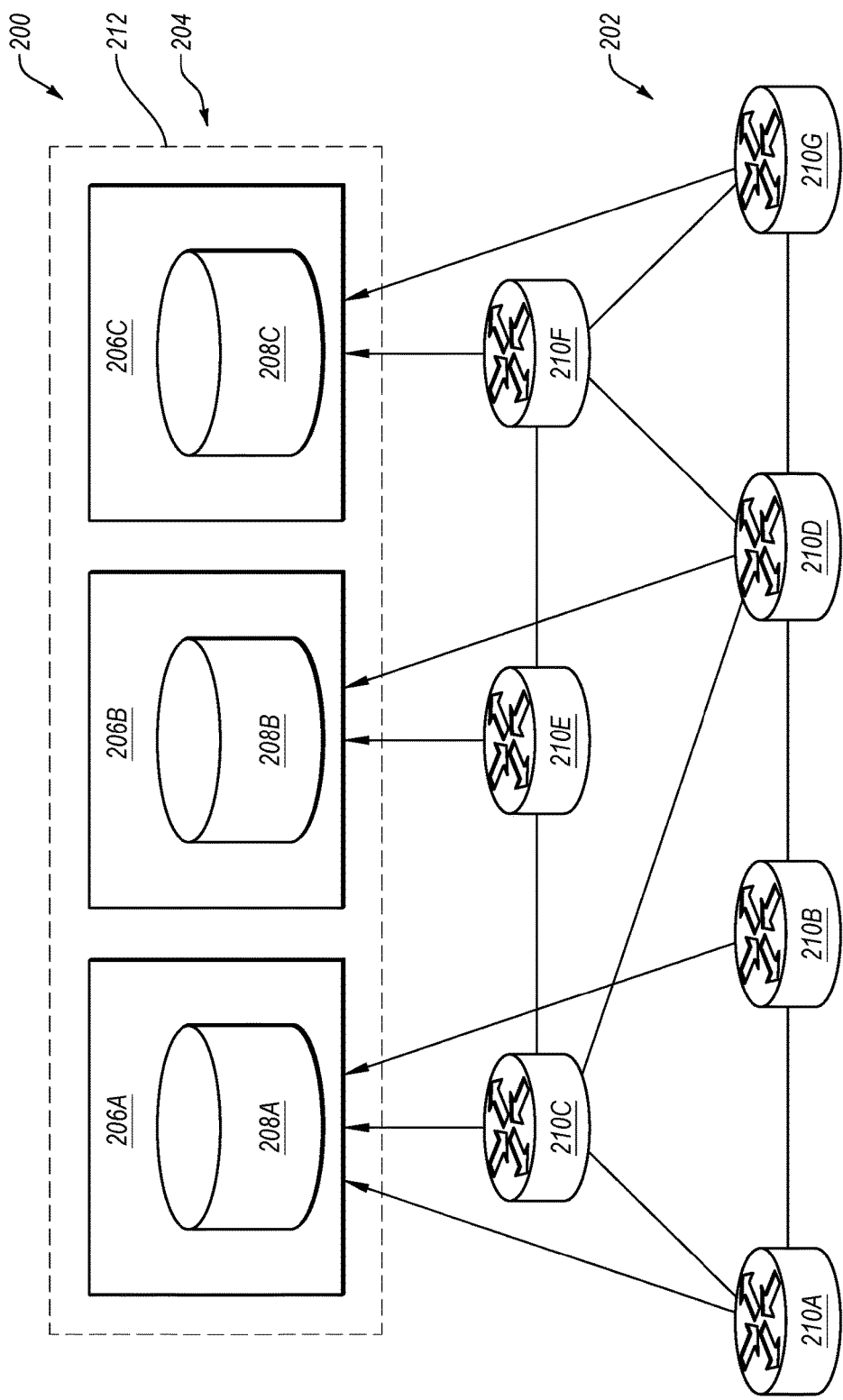
FIG. 2 is a block diagram of a distributed SDN.

FIG. 2 is a block diagram of a distributed SDN. A distributed SDN 200 may include a data plane 202 decoupled from a control plane 204. The control plane 204 may include functions that may be implemented in a distributed SDN controller 212 which may include one or more distributed controllers 206, more specifically distributed controllers 206A-206C. Each distributed controller 206 may include a data store 208, more specifically data stores 208A-208C, with each configured to store resource allocation information including switch specific information.

A data plane 202 of distributed SDN 200 may include a number of switches 210, more specifically may include switches 210A-210G. The switches 210 forward packets according to rules stored in flow tables (not shown) within the switches 210 with the distributed controllers 206 controlling each switch 210 by setting up the rules. Various switches 210, as defined in the respective data stores 208, may be associated with each distributed controller 206. Specifically and by way of example, switches 210A-210C may be associated with distributed controller 206A, switches 210D and 210E may be associated with distributed controller 206B, and switches 210F and 210G may be associated with the distributed controller 206C.

The distributed SDN 200 may further include applications (not shown) interacting with the distributed SDN controller 212 to implement different control logic and network functions. Packet processing rules may be installed in switches either when a new flow arrives or prior to the arrival of a new flow.

Figure 3:
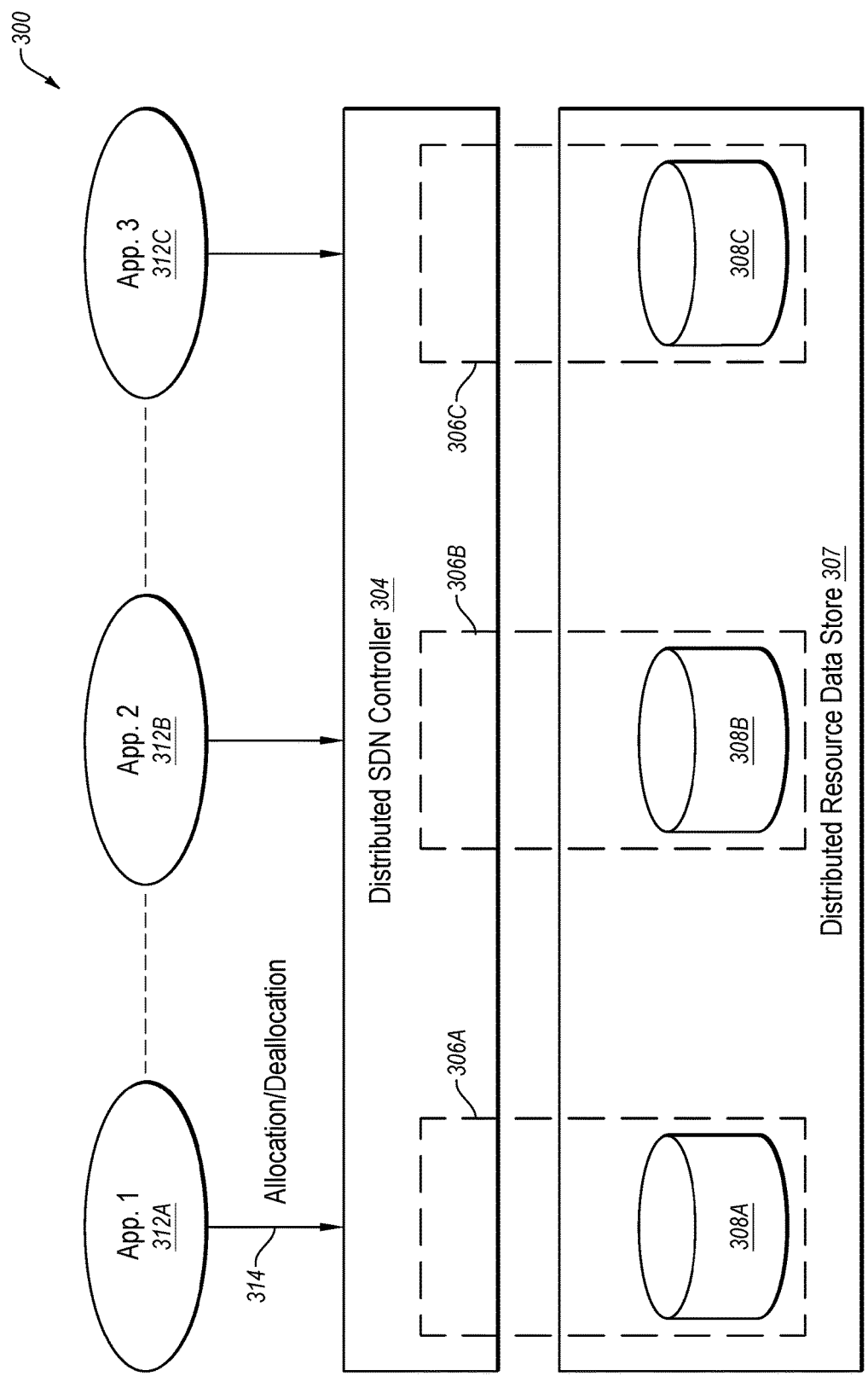
FIG. 3 is a block diagram of a distributed SDN with distributed data store.

FIG. 3 is a block diagram of a distributed SDN with a distributed data store. A distributed SDN 300 may include a distributed SDN controller 304 which may further include one or more distributed controllers 306, more specifically distributed controllers 306A-306C. The distributed SDN controller 304 may couple to a distributed resource data store 307. Each distributed controller 306 may include or couple to a data store 308, more specifically data store 308A-308C, with each configured to store resource allocation information including switch specific information.

A data plane (not shown in FIG. 3) of distributed SDN 300 may include a number of switches. The switches forward packets according to rules stored in flow tables (not shown) within the switches with the distributed controllers 306 controlling each switch by setting up the rules.

The distributed SDN 300 may further include applications 312, more specifically applications 312A-312C, interacting with the distributed controllers 306 to implement different control logic and network functions. Packet processing rules may be installed in switches either when a new flow arrives or prior to the arrival of a new flow.

In the distributed SDN 300, an application 312 may issue an allocation/deallocation directive 314 causing the one or more distributed controllers 306 to generate an add/remove/update signal to one of the distributed data stores 308.

FIG. 4 illustrates an example of information stored in the distributed data store 308 of FIG. 3. The distributed data store 308 may include information 400 including an identification of resources 402 and respective assigned users 404. The various identified resources 402 and users 404 are merely illustrative. By way of example, a specific resource may be identified as including a Node_1 406 and Node_2 426 which may be one or more switches 210 of FIG. 2. By way of example, the Node_1 406 may further include a Port_1 410 and a Port_2 418. Port_1 410 may further include a VLAN ID_1 414 having a user identified as App_2 416. Similarly, Port_2 418 may further include a MPLS Label_1 422 having a user identified as App_1 424. By way of example, other resources 402 may be unassigned to any user 404.

Figure 5:
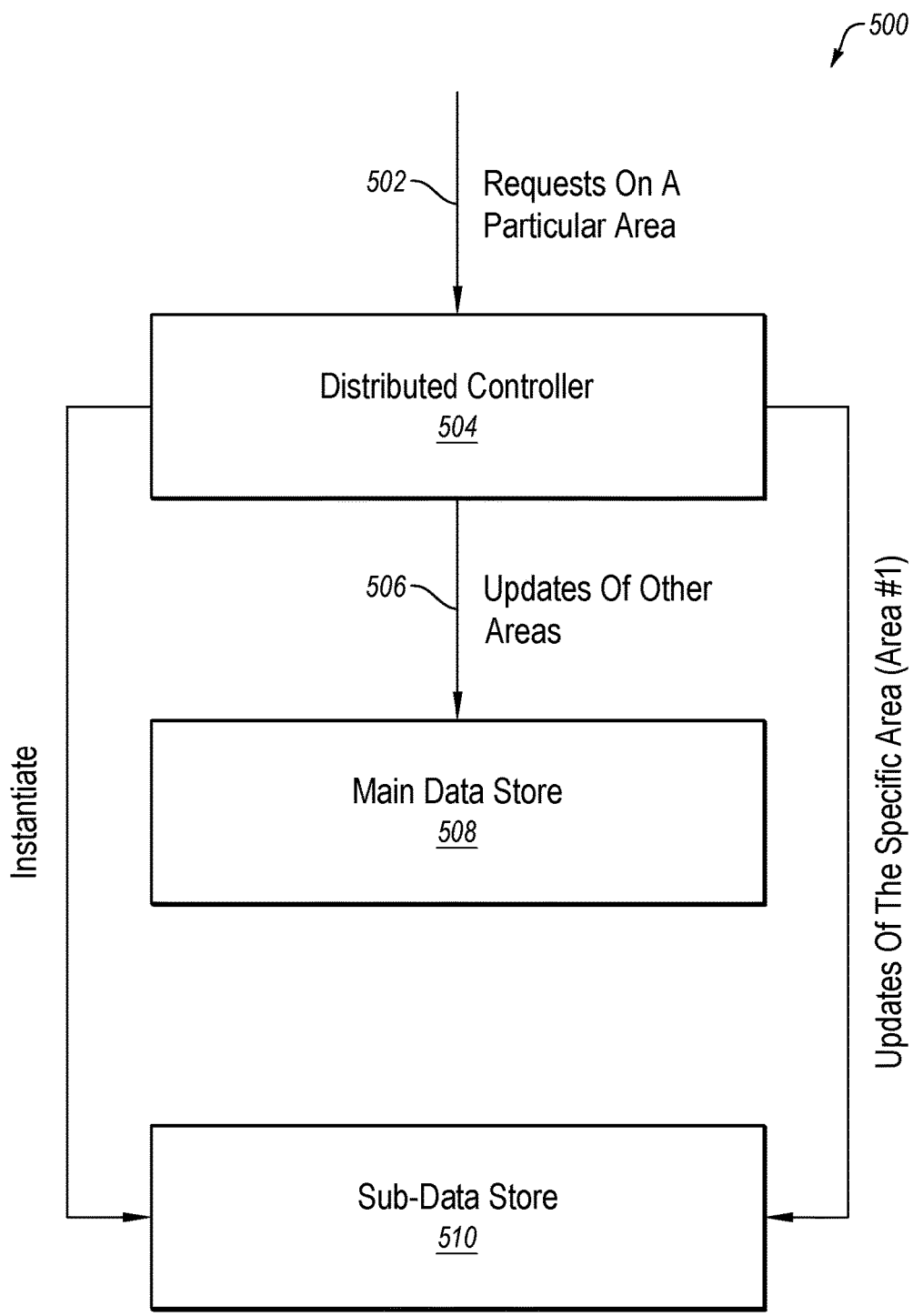
FIG. 5 is a block diagram of a distributed SDN controller.

FIG. 5 is a block diagram of a distributed SDN controller. A distributed SDN controller 500 may include a distributed controller 504 and a main data store 508. The distributed controller 504 receives and processes requests 502 and manages the main data store 508. The distributed controller 504 may also generate updates 506 to the main data store 508.

In operation, when a request on a resource by an application (not shown in FIG. 5) causes a write request to a main data store 508, the distributed SDN controller 500 engages in a persistency process to distribute the updated data store information to any other distributed main data stores in the SDN. A write request to the main data store, as generated by one or more applications, causes time delay in the SDN since write requests are performed serially in order to preserve consistency among any distributed main data stores.

In the distributed SDN controller 500 of FIG. 5, portions of the main data store 508 that are receiving write requests at a high frequency are determined. When a portion of the main data store receiving high frequency write requests is identified, then the distributed SDN controller 500 may instantiate a sub-data store 510 sized sufficient to accommodate the high frequency request portion of the main data store 508. Thereafter, the distributed SDN controller 500 may populate the sub-data store 510 and places virtual identifiers in the main data store at the locations identified as having high frequency write requests to the main data store 508.

Figure 6:
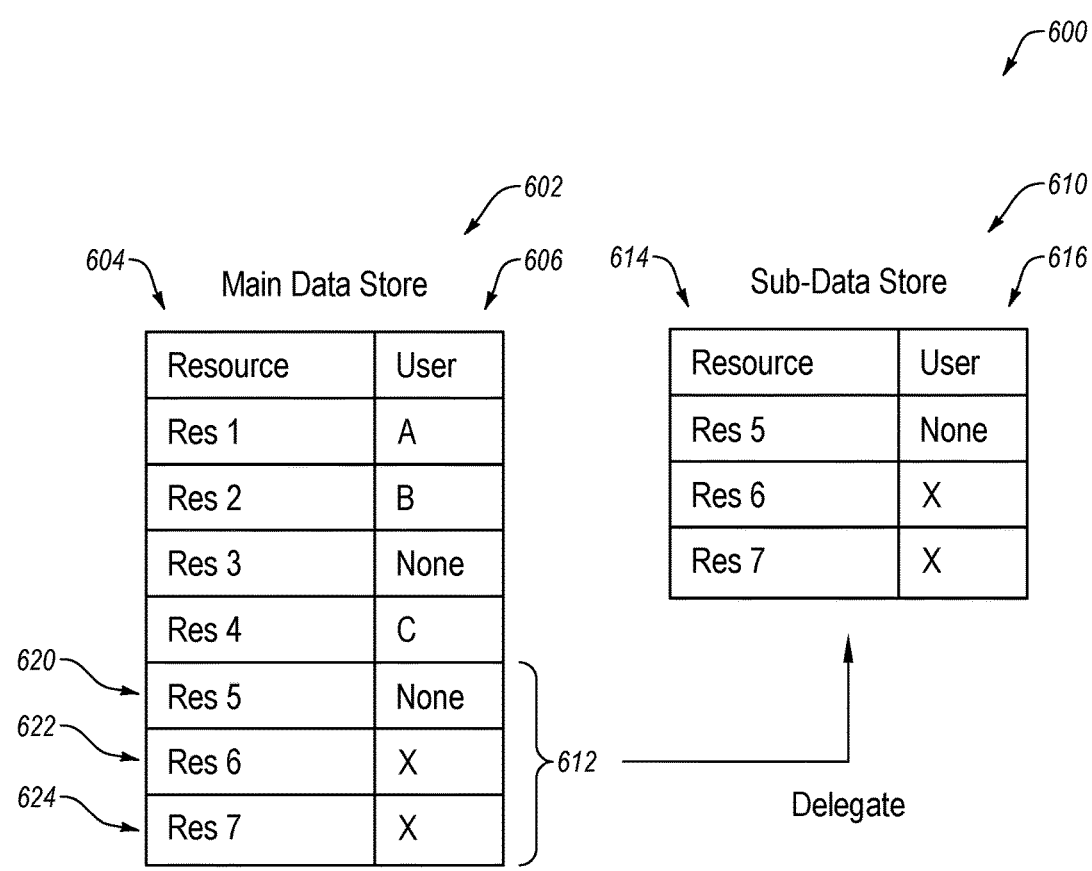
FIG. 6 illustrates a data store structure for a distributed SDN.

FIG. 6 illustrates a data store structure for a distributed SDN. The data store structure 600 may include a main data store 602 including resources 604 and users 606. As described above, the distributed SDN controller 500 may identify, through one of several high frequency write request identification processes, a portion 612 of the main data store 602 that is subjected to high frequency write requests. The high frequency request identification process may include determining, based on a threshold, a quantity of write requests for the portion of the main data store 602. Also, the high frequency request identification process may include determining the high frequency write portion 612 of main data store 602 by receiving a declaration or identification of applications or users that may be or are generating a high frequency of write requests. Alternatively, the portion of the main data store that is subject to high frequency write requests may be identified by historical resource requests.

FIG. 6 further illustrates the portion 612, including resource_5 620, resource_6 622 and resource_7 624, exhibit high frequency write requests. The distributed SDN controller 500 may then instantiate the sub-data store 610 with the resources 620-624 then being populated into a sub-data store 610 which may include corresponding resources 614 and respective users 616. Upon a write request into portion 612, the distributed controller 504 of FIG. 5 may access the sub-data store 610 as referenced by virtual identifiers placed in the main data store 602.

Figure 7:
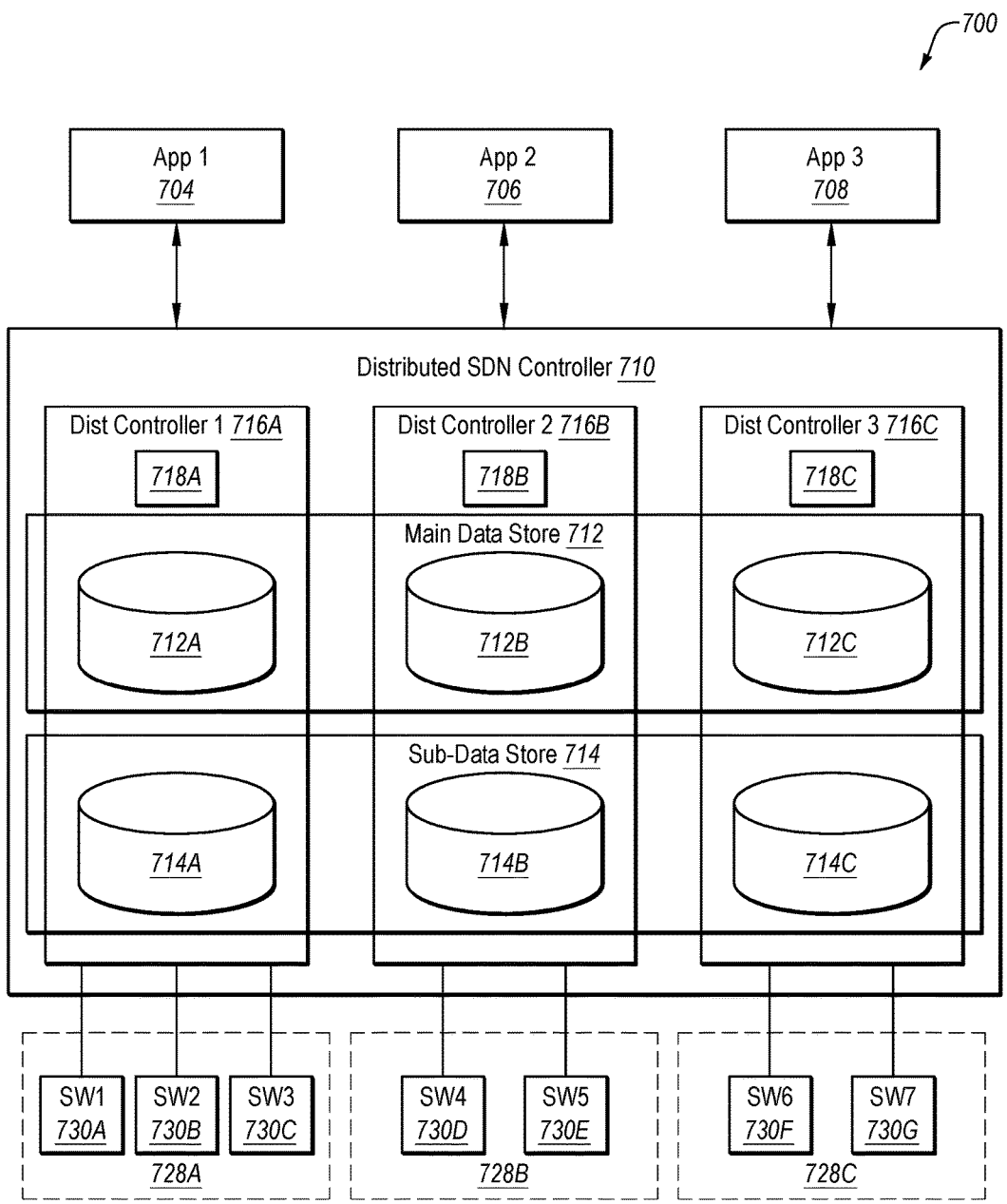
FIG. 7 illustrates a distributed SDN with an additional distributed data store.

FIG. 7 illustrates a distributed SDN with an additional distributed data store. An SDN 700 may include one or more applications 704, 706 and 708, coupled to an SDN controller 710. The applications 704-708 may provide read and write requests to the distributed SDN controller 710 to configure the various resources such as switches 730, an example of which are illustrated as switches 730A-730G.

The distributed SDN controller 710 may further include one or more distributed controllers 716, an example of which is illustrated as a distributed controller_1 716A, a distributed controller_2 716B and a distributed controller_3 716C. Each distributed controller 716 provides control to at least a portion of the resources, illustrated as the switches 730. By way of example, the distributed controller 716A is illustrated as controlling a cluster 728A of the switches 730A-730C, the distributed controller 716B is illustrated as controlling a cluster 728B of the switches 730D and 730E, and the distributed controller 716C is illustrated as controlling a cluster 728C of the switches 730F and 730G.

The distributed SDN controller 710 may further include a main data store 712 distributed across the distributed controllers 716. A first distribution 712A of the main data store 712 is associated with the distributed controller_1 716A, a second distribution 712B of the main data store 712 is associated with the distributed controller_2 716B, and a third distribution 712C of the main data store 712 is associated with the distributed controller_3 716C.

The distributed SDN controller 710 may further include a sub-data store 714 distributed across the distributed controllers 716. A first distribution 714A of the sub-data store 714 may be associated with the distributed controller_1 716A, a second distribution 714B of the sub-data store 714 may be associated with the distributed controller_2 716B, and a third distribution 714C of the sub-data store 714 may be associated with the distributed controller_3 716C.

The main data store 712 and the sub-data store 714 may further include functionality including logic to provide updates from the data stores within the distributed controller receiving the write request to the data stores in the other distributed controllers.

The distributed SDN controller 710 may further include control logic 718, illustrated herein as separate control logics 718A, 718B, and 718C in each of the distributed controllers 716, illustrated herein as separate controllers 716A, 716B, and 716C, for dispatching read/write requests for resources to the sub-data store 714, illustrated herein as separate sub-data stores 714A, 714B, and 714C, when the requested resource is found in the sub-data store.

Figure 8:
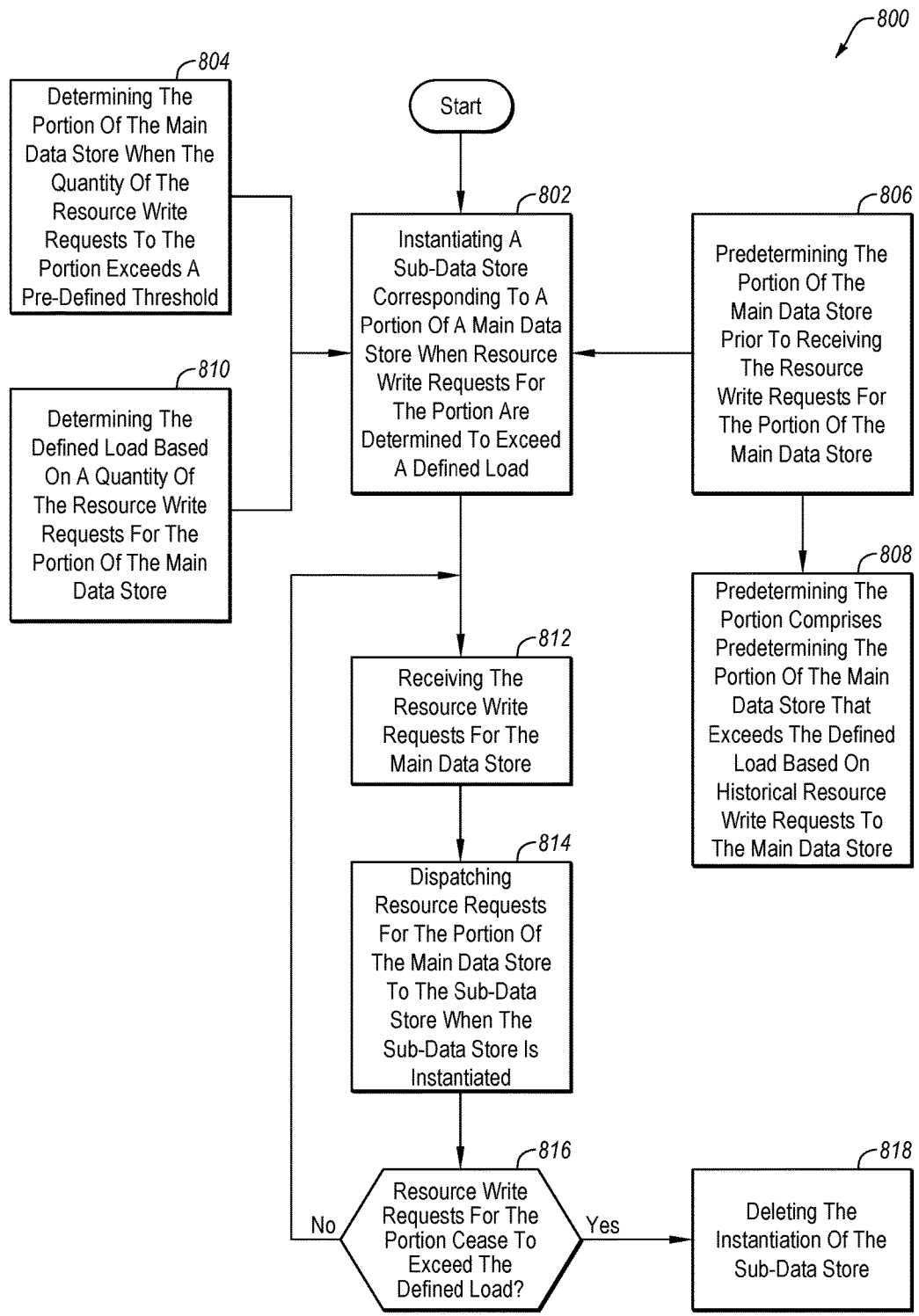
FIG. 8 is a flowchart for resource allocation in an SDN controller.

FIG. 8 is a flowchart for resource allocation in an SDN controller, in accordance with at least one embodiment of the present disclosure. Method 800 may be performed by any suitable system, apparatus, or device. For example, SDN 700 of FIG. 7 or one or more of the components thereof may perform one or more of the operations associated with method 800. In these and other embodiments, program instructions stored on a computer readable medium may be executed to perform one or more of the operations of method 800.

At block 802, a sub-data store corresponding to a portion of a main data store is instantiated when resource write requests for the portion are determined to exceed a defined load. The portion of the main data store may be determined in alternative manners. For example, in a block 804, the portion may be determined based on a quantity of resource write requests to the portion of the main data store that exceeds a defined threshold. The defined threshold may be a value determined as causing unacceptable delays in the distributed SDN controller or may be determined based on other factors such as resource assignment or latency.

Alternatively at block 806, the portion of the main data store to be instantiated into the sub-data store may be determined by network decisions prior to receiving resource write requests to the portion. Such determination prior to instantiation may be as part of the network configuration or resource allocation to distributed controllers. Further at block 808, the determination prior to receiving resource write requests may be based on historical data associated with resource write requests to the portion of the main data store.

Further, the defined load may be variously determined. At block 810, the defined load may be determined by an acceptable quantity of resource write requests. The defined load may vary due to differences in acceptable loads and latency and may also vary due to differences in hardware and software used to implement the distributed SDN controller.

After the sub-data store is instantiated in block 802, at block 812, the distributed SDN controller may receive resource write requests to the portion of the main data store.

At a block 814, the resource requests for the portion of the main data store, including the read and write requests, may be dispatched to the sub-data store when the sub-data store is instantiated.

At a query block 816, a decision may be made as to whether the actual load, that is to say the quantity of resource requests to the portion of the main data store instantiated in the sub-data store, has been reduced from exceeding the defined load. When the load has not been reduced, then processing may continue to receive resource requests at block 812.

At a block 818 when the actual load has been determined to be reduced below the defined load, then the instantiation of the sub-data store may be deleted when the resource write requests for the portion cease to exceed the defined load.

Modifications, additions, or omissions may be made to method 800 without departing from the scope of the present disclosure. For example, the operations of method 800 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

As used in the present disclosure, the terms "module" or "component" may refer to specific hardware implementations configured to perform the actions of the module or component and/or software objects or software routines that may be stored on and/or executed by general purpose hardware (for example, computer-readable media, processing devices, etc.) of the computing system. In some embodiments, the different components, modules, engines, and services described in the present disclosure may be implemented as objects or processes that execute on the computing system (for example, as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (for example, bodies of the appended claims) are generally intended as "open" terms (for example, the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method for resource allocation in a Software Defined Network (SDN) controller, comprising:
   instantiating, in a distributed controller included within the SDN controller, a sub-data store within the distributed controller, the sub-data store corresponding to a portion of a main data store included within the distributed controller, the sub-data store instantiated within the distributed controller when resource write requests for the portion are determined to exceed a defined load within the distributed controller;
   receiving the resource write requests for the main data store at the distributed controller; and
   dispatching, by the distributed controller, resource requests for the portion of the main data store to the sub-data store when the sub-data store is instantiated.

2. The method of claim 1, further comprising determining the portion of the main data store when a quantity of the resource write requests to the portion exceeds a pre-defined threshold.

3. The method of claim 1, further comprising determining the defined load based on a quantity of the resource write requests for the portion of the main data store.

4. The method of claim 1, further comprising predetermining the portion of the main data store prior to receiving the resource write requests for the portion of the main data store.

5. The method of claim 4, wherein predetermining the portion comprises predetermining the portion of the main data store that exceeds the defined load based on historical resource write requests to the main data store.

6. The method of claim 1, further comprising deleting the instantiation of the sub-data store when the resource write requests for the portion cease to exceed the defined load.

7. One or more non-transitory computer-readable medias that include instructions that, when executed by one or more processing systems, are configured to cause the processing system to perform operations for resource allocation in a Software Defined Network (SDN) controller, the operations comprising:
   instantiating, in a distributed controller included within the SDN controller, a sub-data store within the distributed controller, the sub-data store corresponding to a portion of a main data store included within the distributed controller, the sub-data store instantiated within the distributed controller when resource write requests for the portion are determined to exceed a defined load within the distributed controller;
   receiving resource write requests for the main data store at the distributed controller; and
   dispatching, by the distributed controller, resource requests for the portion of the main data store to the sub-data store when the sub-data store is instantiated.

8. The computer-readable media of claim 7, wherein the operations further comprise determining the portion of the main data store when a quantity of the resource write requests to the portion exceeds a pre-defined threshold.

9. The computer-readable media of claim 7, wherein the operations further comprise determining the defined load based on a quantity of the resource write requests for the portion of the main data store.

10. The computer-readable media of claim 7, wherein the operations further comprise predetermining the portion of the main data store prior to receiving the resource write requests for the portion of the main data store.

11. The computer-readable media of claim 10, wherein predetermining the portion comprises predetermining the portion of the main data store that exceeds the defined load based on historical resource write requests to the main data store.

12. The computer-readable media of claim 7, wherein the operations further comprise deleting the instantiation of the sub-data store when the resource write requests for the portion cease to exceed the defined load.

13. A distributed Software Defined Network (SDN) controller, comprising:
   a main data store of a distributed controller within the SDN controller;

a sub-data store within the distributed controller included within the SDN controller corresponding to a portion of the main data store included within the distributed controller and the sub-data store instantiated within the distributed controller when resource write requests at the distributed controller for the portion exceeds a defined load within the distributed controller; and control logic of the distributed controller of the SDN controller configured to dispatch, by the distributed controller, resource requests for the portion of the main data store to the sub-data store when the sub-data store is instantiated.

14. The SDN controller of claim 13, wherein the defined load is determined by a quantity of the resource write requests for the portion of the main data store.

15. The SDN controller of claim 13, wherein the portion of the main data store is predetermined prior to instantiation of the sub-data store.

16. The SDN controller of claim 13, wherein the portion of the main data store is determined based on historical resource write requests.

17. The SDN controller of claim 13, wherein the instantiation of the sub-data store is deleted when the resource write requests for the portion do not exceed the defined load.

18. The SDN controller of claim 13, wherein the portion of the main data store is determined when a quantity of the resource write requests exceeds a pre-defined threshold.

* * * * *